Figure 1:
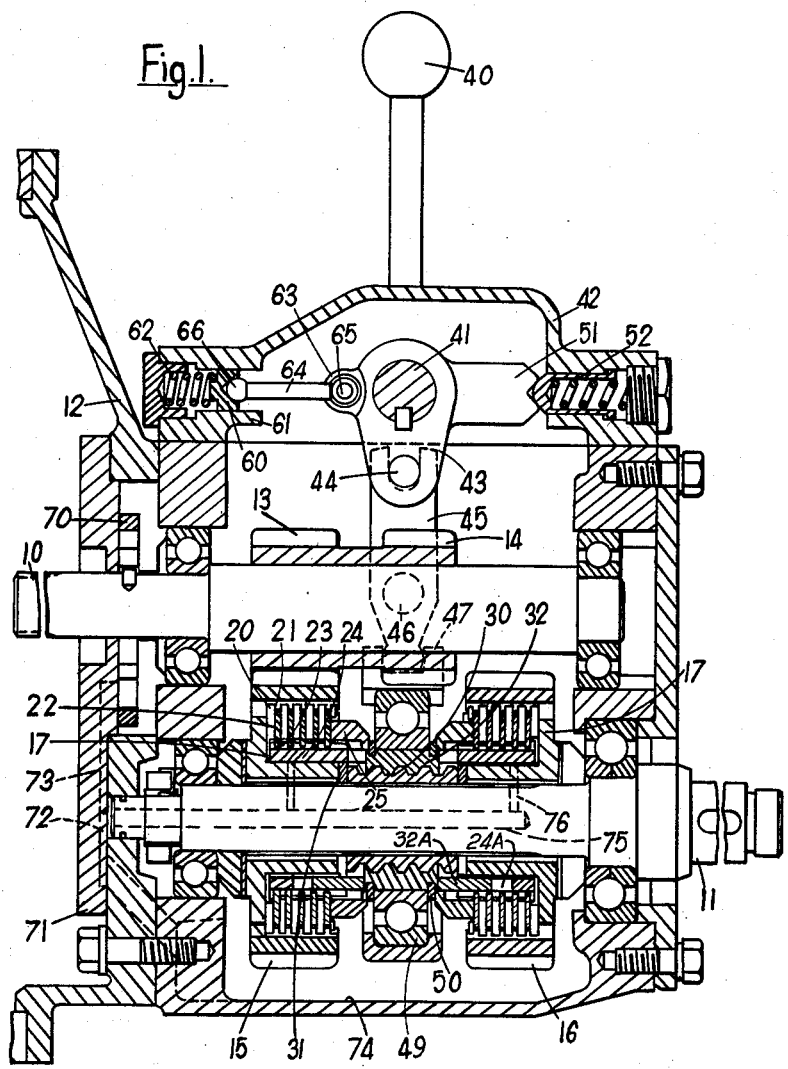

June 2, 1964   H. E. MERRITT   3,135,129
REVERSING GEAR
Filed March 5, 1962   2 Sheets-Sheet 1

Inventor
Henry E. Merritt
By Rommel, Allwine and Rommel
Attorneys

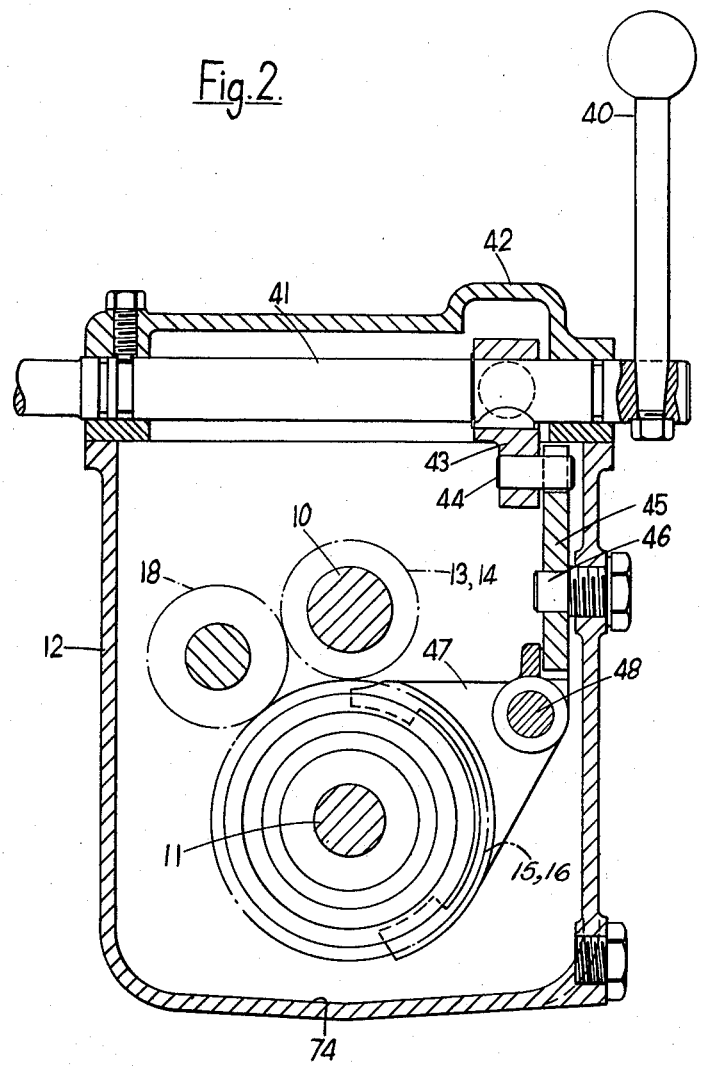

United States Patent Office 3,135,129
Patented June 2, 1964

3,135,129
REVERSING GEAR
Henry E. Merritt, Lion Hill, Claverdon,
Warwickshire, England
Filed Mar. 5, 1962, Ser. No. 177,606
2 Claims. (Cl. 74—377)

This invention relates to reversing gears suitable for power transmission systems in general and especially suitable for marine propulsion systems driven by engines of up to one or two hundred horse power.

The object of the invention is to provide a reversing gear of simple, compact and economic construction and nevertheless effective and reliable and easily maintained in serviceable condition.

According to the invention the reversing gear comprises forward and reverse gearwheels associated with an output shaft and driven in opposite directions, a forward clutch and a reverse clutch interposed between the output shaft and the forward and reverse gearwheels, respectively, a pair of complementary rotatable torque-transmitting components of which the input component is connected with the driven parts of both clutches and is displaceable axially and rotationally to bring the driven and driving parts of either clutch into inter-engagement so as to receive assisting torque from said parts and of which the output component is connected with the output shaft to rotate with it in either direction, and a reversing controller connected with said input component for displacing it in either direction.

In the neutral position of the controller the driving parts of the clutches rotate idly in relation to the driven parts, which are stationary for the time being, whereas when the controller is moved to displace the input torque-transmitting component in either direction—say the forward direction—said component brings the forward-clutch driven and driving parts into inter-engagement so that said component tends to be rotated in unison with the forward clutch parts and to rotate the complementary component also in unison. The arrangement is such that ultimately the torque of the input shaft is transmitted through the driving and driven clutch parts to the input and output torque-transmitting components and torsionally assists the input component to press the driven against the driving clutch parts. That is to say, the clutch action is torque-assisted.

The torque-transmitting components may be helically threaded, the output component being a worm-like sleeve on the output shaft and the input component being a nut-like collar embracing said sleeve.

Preferably, the action of the torque-transmitting components is not self-locking and therefore it is desirable to provide a spring device which is applied to the input torque-transmitting component to urge it when moved to its forward and reverse positions to apply clutch-engaging pressure to the driven clutch parts.

Conduits for low pressure oil may be provided in the output shaft and led to various rotating parts.

An example of the improved reversing gear is shown in the accompanying drawings as designed for a marine propulsion system. In the drawings, FIG. 1 is an axial section of the gear and FIG. 2 is a cross-section.

The reversing gear includes a input shaft 10 and an output shaft 11 both journalled in bearings in a gear-case 12. Integral ahead and astern pinions 13, 14, are secured to the input shaft. Ahead and astern gearwheels 15, 16, are fixed on carriers 17 freely rotatable on the output shaft, the gearwheel 15 meshing directly with the pinion 13 and the gearwheel 16 meshing with the pinion 14 through reversing idlers 18. The arrangement is such that both gearwheels 15, 16, are continuously rotated in opposite directions.

Ahead and astern clutches are interposed between the gearwheels 15, 16, and the output shaft. Seeing that both clutches are similar only the ahead clutch will be described in detail.

In the example, the clutch is of the multiple friction-plate type. A pack of driving plates 20 are arranged within the gearwheel 15, being slidably engaged with internal splines 21 in the gearwheel. A pack of driven plates 22 are inter-leaved with the plates 20, being slidably engaged with external splines 23 on a ring 24 which is rotatable on the associated carrier 17. In the neutral position, the two packs are lightly sandwiched between the carrier 17, which serves as an axially immovable abutment, and an annular presser 25, so that the driving plates 20 rotate idly and the driven plates remain stationary.

The torque-transmitting components consist of a worm-like sleeve 30, which is splined to the output shaft 11 and is held against axial displacement by keepers 31, and a nut-like collar 32 which embraces the sleeve 30 and is in axial sliding engagement with the splined ring 24. Engagement of the ring 24 and collar 32 is by means of a multiple tongue and slot arrangement, the collar 32 having axial tongues 32A and the rings 24 having corresponding axial slots 24A in which said tongues 32A are located. The collar 32 and sleeve 30 are respectively the input and output components, each being complementary to the other.

The sleeve 30 and collar 32 are helically threaded, the helical inclination of the threads being steep enough to ensure that axial pressure applied to the collar 32 will cause that collar to advance or withdraw rotationally along the sleeve and the direction of inclination being such that when the collar is advanced towards the ahead clutch it rotates in the ahead direction.

The controller of the gear is a hand lever 40 fixed to a fulcrum shaft 41 in the cover 42 of the gear-case 12. An arm 43 keyed to the shaft 41 has a pin 44 that is engaged by the forked end of a lever 45 fulcrumed on a pivot pin 46 on the gear-case. The foot of this lever 45 engages a fork 47 which is slidable along a guide rod 48 and is connected with the collar 32, the input torque-transmitting component, through a ball-bearing 49 and keeper rings 50 in the collar. The shaft 41 has another arm 51 which has a notch engaged by a spring plunger 52 on the cover 42, this plunger serving to hold the hand lever 40 in the neutral position, in which it is shown. The arrangement is such that when the hand lever 40 is being moved from the neutral position to its ahead or astern position, it acts through the lever 45 and fork 47 to urge the collar 32 to move in the appropriate direction along the output shaft 11.

The shaft 41 is associated with a spring device for urging the collar 32 in one or the other direction when the hand lever 40 is moved into either the ahead or reverse position. The spring device comprises a plunger 60 slidable in a cylinder 61 in the cover 42, a spring 62 continuously pressing the plunger towards the shaft 41, a lug 63 on the boss of the arm 43 and a toggle link 64 which at one end has a pivotal connection 65 with the lug 63 and at the output end has a ball-and-socket joint 66 with the plunger 60. In the neutral position of the hand lever 40 the toggle link 64 is in its dead centre setting and so the spring device is ineffective. In either the ahead or astern position of the hand lever 40, the spring device is effective through the arm 43, lever 45 and fork 47 to urge the collar 32 axially to maintain pressure on the ahead or astern clutch, as the case may be.

The reversing gear also includes an oil pump 70 for the lubrication of various parts which are rotatable relatively to one another. In the example, the pump is of the intermeshing gearwheel type, in which an internally lobed annulus encircles an externally lobed pinion, the pump being driven by the input shaft 10. The suction and discharge conduits are formed in an end cover 71 of the gear-case 12. In FIG. 1, these conduits are indicated by 72 and 73. The suction conduit 72 draws oil from the sump 74 of the gear-case. The discharge conduit 73 supplies oil to an axial bore 75 in the output shaft 11, and this bore is tapped by radial ports 76 leading to the torque-transmitting components.

In operation of the gear, when the controller is in the neutral position shown, the ahead gearwheel 15 and ahead driving clutch parts 20 all rotate idly in the ahead direction, the astern gearwheel 16 and astern driving clutch parts all rotate idly in the astern direction, and the collar and sleeve 32, 30 and all the driven clutch parts and the output shaft 11 rest stationary. Assume that the hand lever 40 is moved into the ahead position. This movement is transmitted through the shaft 41 and arm 43, the lever 45, and the fork 47 and ball-bearing 49 to the collar 32, which is forced to move towards the ahead clutch. Seeing that meantime the sleeve 30 is maintained stationary by the output shaft 11, the collar 32 is constrained to move helically along the sleeve 30; i.e. to advance axially and to rotate as it advances. Accordingly, the collar 32 forces the presser 25 to compact the friction plates 20, 22 of the ahead clutch tightly together against the abutment formed by the carrier 17; and so the collar 32 now has torque imparted to it (through the driven plates 22 and ring 24). Since the ring 24 rotates as the clutch engages, and interengagement of the tongues 32A and the slots 24A causes additional torque to be transmitted to the collar 32 which consequently moves further axially and helically towards the clutch. As the clutch tightness increases, the freedom of the collar 32 to move along the sleeve 30 is quickly terminated, and therefore the torque is transmitted from the collar to the sleeve and thence to the output shaft 11, which starts to rotate in the ahead direction. When the clutch plates are pressed together with maximum tightness there is in effect a solid coupling from the ahead gearwheel 15 through the ahead clutch parts, ring 24, pusher 25, collar 32 and sleeve 30 to the output shaft 11.

When the hand lever 40 is released in the ahead position, pressure continues to be exerted on the collar 32 by the spring device 60-65 acting through the parts 41, 43, 45, 47 and 49, as already described, and therefore the spring device acts to maintain the ahead clutch parts in full engagement. In this action the spring device is assisted by the torque acting through the clutch on the collar 32 in relation to the sleeve 30.

When the hand lever 40 is returned to neutral, the collar 32 is withdrawn axially and therefore the ahead clutch parts are disengaged. The action in applying the astern clutch and associated parts is the same as described for ahead propulsion.

As aforesaid the reversing gear particularly described with reference to the drawings is an example; modifications may be made within the scope of the invention claimed. For instance, instead of the separately toothed ahead and astern pinions 13, 14, a single long pinion may be used. Instead of separate carriers 17 to provide accommodation for the clutches in the gearwheels 15, 16, the carriers may be made integral with the respective gearwheels. Instead of multiple friction-plate type clutches cone type clutches may be incorporated in the reversing gear.

I claim:

1. In a reversing gear having an input shaft, an output shaft, forward driving and reverse driving gearwheels driven by the input shaft and rotatably mounted on the output shaft, a forward friction clutch and a reverse friction clutch between the output shaft and the forward and reverse gearwheels respectively, each clutch having a driven part and a driving part, the driving parts being connected to the respective gearwheels for rotation therewith, a rotatably mounted ring mounting the driven parts of said clutches, and a reversing controller for selective engagement of either clutch; two torque transmitting components located between the clutches comprising an output component in the form of a helically threaded worm-like sleeve splined to the output shaft and an input component in the form of a nut like collar which is drivable by the ring and is mounted on the worm-like sleeve; and including pusher means between the nut like collar and the forward and reverse clutch respectively, actuatable to push the driving and driven members of either clutch into interengagement, said nut like collar being displaceable by said reversing controller axially and consequently rotationally on the worm-like sleeve to actuate the pusher means, whereby, as the driven member of the clutch rotates, the nut like collar moves further axially and rotationally on the worm-like sleeve towards the selected clutch and provides additional push from the pusher means thereby increasing the frictional engagement of the clutch.

2. A reversing gear as claimed in claim 1 having a control shaft mounting the reversing controller, a pressure transmitting toggle link, and a spring and plunger, said plunger being pivotally connected to one end of the toggle link and the other end of the toggle link being pivotally connected to the reversing controller, the arrangement being such that the reversing controller is held in a selected one of two positions by toggle action and the toggle link is pivoted relative to the controller so that said controller is maintained in a neutral position until one of said two positions is selected.

References Cited in the file of this patent

UNITED STATES PATENTS

| 1,414,622 | Carter | May 2, 1922 |
|---|---|---|
| 1,696,178 | Ahlm | Dec. 25, 1928 |
| 2,077,663 | Batten | Apr. 20, 1937 |
| 2,375,524 | Clarke | May 8, 1945 |
| 2,547,732 | Baker | Apr. 3, 1951 |

FOREIGN PATENTS

| 376,804 | France | June 22, 1907 |
|---|---|---|
| 868,379 | Germany | Feb. 23, 1953 |